(12) United States Patent
Kouno et al.

(10) Patent No.: US 9,726,065 B2
(45) Date of Patent: Aug. 8, 2017

(54) WORK VEHICLE

(71) Applicant: KOMATSU LTD., Tokyo (JP)

(72) Inventors: Kiichirou Kouno, Hirakata (JP); Ken Itou, Hirakata (JP); Jin Yogita, Hirakata (JP); Kozo Okuda, Hirakata (JP); Yasuyuki Onodera, Oyama (JP); Hideo Oguri, Oyama (JP); Shouhei Nagasaka, Oyama (JP); Minato Tomuro, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/235,142

(22) PCT Filed: Sep. 25, 2013

(86) PCT No.: PCT/JP2013/075837
§ 371 (c)(1),
(2) Date: Jan. 27, 2014

(87) PCT Pub. No.: WO2015/045023
PCT Pub. Date: Apr. 2, 2015

(65) Prior Publication Data
US 2015/0082774 A1 Mar. 26, 2015
US 2015/0308313 A2 Oct. 29, 2015

(51) Int. Cl.
*F01N 3/00* (2006.01)
*F01N 3/20* (2006.01)
(Continued)

(52) U.S. Cl.
CPC ............ *F01N 3/208* (2013.01); *E02F 3/7609* (2013.01); *E02F 9/0866* (2013.01);
(Continued)

(58) Field of Classification Search
CPC . B01D 53/9431; F01N 3/208; F01N 2610/02; F01N 2610/10; F01N 2610/11;
(Continued)

(56) References Cited

U.S. PATENT DOCUMENTS

| 5,976,475 A | 11/1999 | Peter-Hoblyn et al. |
| 2005/0081803 A1* | 4/2005 | Yoshimatsu ............. F01P 5/06 123/41.65 |

(Continued)

FOREIGN PATENT DOCUMENTS

| CN | 1257435 A | 6/2000 |
| JP | 2000-27627 A | 1/2000 |
| JP | 2003-20936 A | 1/2003 |
| JP | 2009-97479 A | 5/2009 |
| JP | 2012-215151 A | 11/2012 |
| JP | 2013-181400 A | 9/2013 |

OTHER PUBLICATIONS

The International Search Report for the corresponding international application No. PCT/JP2013/075837, issued on Dec. 17, 2013.
(Continued)

*Primary Examiner* — Jason Shanske
*Assistant Examiner* — Kelsey Stanek
(74) *Attorney, Agent, or Firm* — Global IP Counselors, LLP (57) ABSTRACT

A work vehicle includes a vehicle body, a guiding pipe, a first heating section, and a second heating section. The vehicle body has a partition wall that partitions a space in an inner section into a first region and a second region. The guiding pipe is configured to guide a reducing agent. The guiding pipe has a first pipe section and a second pipe section. The first pipe section is positioned inside the first region. The second pipe section is positioned in the second region. The first heating section heats the first pipe section. The second heating section heats the second pipe section and adjusts the temperature independently from the first heating section.

24 Claims, 7 Drawing Sheets

(51) Int. Cl.
  *E02F 3/76* (2006.01)
  *E02F 9/08* (2006.01)
  *F01N 3/28* (2006.01)
  *F01N 9/00* (2006.01)
(52) U.S. Cl.
  CPC ............ *F01N 3/2066* (2013.01); *F01N 3/28* (2013.01); *F01N 9/00* (2013.01); *F01N 2590/08* (2013.01); *F01N 2610/02* (2013.01); *F01N 2610/105* (2013.01); *F01N 2610/14* (2013.01); *F01N 2610/148* (2013.01); *F01N 2900/1811* (2013.01); *Y02T 10/24* (2013.01)
(58) Field of Classification Search
  CPC ..... F01N 2610/1473; F01N 2900/1811; F01N 2900/1812; F01N 3/2066; F01N 2590/08; F01N 2610/14; F01N 2610/148; F01N 2610/105; F01N 3/28; E02F 3/7609; E02F 9/0866
  USPC .................................................. 60/272–324
  See application file for complete search history.

(56) References Cited

U.S. PATENT DOCUMENTS

| | | | | |
|---|---|---|---|---|
| 2009/0101631 | A1* | 4/2009 | Farell | H02J 1/14 219/202 |
| 2010/0186381 | A1* | 7/2010 | Charles | F01N 3/025 60/282 |
| 2010/0242439 | A1* | 9/2010 | Domon et al. | 60/274 |
| 2012/0174566 | A1* | 7/2012 | Yamashita | B60K 13/04 60/295 |
| 2013/0000729 | A1* | 1/2013 | Mokire | F01N 3/2066 137/1 |
| 2014/0290220 | A1* | 10/2014 | Ozaki | F01N 3/08 60/282 |

OTHER PUBLICATIONS

Office Action for the corresponding Chinese patent application No. 201380002287.5, issued on Dec. 3, 2015.

\* cited by examiner

WORK VEHICLE

CROSS-REFERENCE TO RELATED APPLICATIONS

This application is a U.S. National stage application of International Application No. PCT/JP2013/075837, filed on Sep. 25, 2013.

BACKGROUND

Field of the Invention

The present invention relates to a work vehicle.

Background Information

An exhaust treatment apparatus for treat exhaust from an engine is mounted in a work vehicle. The exhaust treatment apparatus reduces nitrogen oxide (NOx) in the exhaust using a reducing agent which is supplied via a guiding pipe.

The reducing agent freezes at low temperatures. As a result, a heat insulating apparatus for insulating the reducing agent is proposed in Japan Patent Laid-open Patent Publication JP-A-2000-27627. The heat insulating apparatus has a heating wire which is arranged to span along the entire outer surface of a supply pipe for the reducing agent. Here, the power supply to the heating wire is controlled to be on or off according to the temperature of the reducing agent which is detected by a temperature sensor.

SUMMARY

A work vehicle has regions which are partitioned from each other (referred to below as a "first region" and a "second region") in an inner section. The first region and the second region are not limited to being the same temperature and differences in temperature exist between each of the regions. Accordingly, the temperature of the reducing agent in the guiding pipe which is positioned inside the first region and the temperature of the reducing agent in the guiding pipe which is positioned inside the second region are different. For example, in a case where the first region is an engine room and the second region is an accommodating space for a radiator, the temperature of the reducing agent in the guiding pipe which is positioned inside the first region is comparatively high and the temperature of the reducing agent in the guiding pipe which is positioned inside the second region is comparatively low.

In the above situation, when the temperature of the entire guiding pipe is adjusted to be uniform, it is difficult to appropriately adjust the temperature of the reducing agent. For example, when the power supply to the heating wire is turned on and off based on the temperature inside the second region which is a lower temperature, the temperature of the reducing agent inside the first region which is a higher temperature is excessively increased and there is a possibility that degradation of the reducing agent will proceed. Alternatively, when the power supply to the heating wire is turned on and off based on the temperature inside the first region which is a higher temperature, the temperature of the reducing agent inside the second region which is a lower temperature is excessively decreased and there is a possibility that the reducing agent will freeze.

An object of the present invention is to provide a work vehicle where it is possible to appropriately adjust the temperature of a reducing agent in environments where the temperatures are different.

A work vehicle according to an aspect of the present invention is provided with a vehicle body, a pipe, a first heating section, and a second heating section. The vehicle body has a partition wall. The partition wall partitions the space in the inner section of the vehicle body into a first region and a second region. The pipe has a first pipe section and a second pipe section. The first pipe section is positioned inside the first region. The second pipe section is positioned in the second region. The first heating section heats the first pipe section. The second heating section heats the second pipe section and is configured to adjust the temperature independently from the first heating section.

In this case, it is possible to independently adjust each of the temperature of the reducing agent inside the first pipe section and the temperature of the reducing agent inside the second pipe section. Due to this, it is possible to appropriately adjust each of the temperature of the reducing agent inside the first pipe section and the temperature of the reducing agent inside the second pipe section.

It is preferable for the work vehicle to be further provided with a first temperature sensor, a second temperature sensor, and a controller. The first temperature sensor is arranged inside the first region. The second temperature sensor is arranged inside the second region. The controller controls the first heating section and the second heating section. The controller controls the first heating section based on a detection signal from the first temperature sensor and controls the second heating section based on a detection signal from the second temperature sensor.

In this case, it is possible to adjust the temperature of the reducing agent in the first pipe section based on the temperature of the first region which is detected by the first temperature sensor. In addition, it is possible to adjust the temperature of the reducing agent in the second pipe section based on the temperature of the second region which is detected by the second temperature sensor. Due to this, it is possible to appropriately adjust each of the temperature of the reducing agent in the first pipe section and the temperature of the reducing agent in the second pipe section.

It is preferable for the work vehicle to be further provided with a first temperature sensor and a controller. The first temperature sensor is arranged inside the first region. The controller controls the first heating section and the second heating section. The controller controls the first heating section based on a detection signal from the first temperature sensor and controls the second heating section based on a temperature which is calculated based on the detection signal from the first temperature sensor.

In this case, it is possible to adjust the temperature of the reducing agent in the first pipe section based on the temperature of the first region which is detected by the first temperature sensor. In addition, it is possible to adjust the temperature of the reducing agent in the second pipe section based on the temperature of the second region which is determined from the temperature of the first region using a calculation. Due to this, it is possible to appropriately adjust each of the temperature of the reducing agent in the first pipe section and the temperature of the reducing agent in the second pipe section.

It is preferable for the work vehicle to be further provided with a second temperature sensor and a controller. The second temperature sensor is arranged inside the second region. The controller controls the first heating section and the second heating section. The controller controls the second heating section based on a detection signal from the second temperature sensor and controls the first heating section based on the temperature which is calculated based on the detection signal from the second temperature sensor.

In this case, it is possible to adjust the temperature of the reducing agent in the second pipe section based on the temperature of the second region which is detected by the second temperature sensor. In addition, it is possible to adjust the temperature of the reducing agent in the first pipe section based on the temperature of the first region which is determined from the temperature of the second region using a calculation. Due to this, it is possible to appropriately adjust each of the temperature of the reducing agent in the first pipe section and the temperature of the reducing agent in the second pipe section.

It is preferable for the work vehicle to be further provided with an engine, for the first region to be an engine room in which the engine is arranged, and for the second region to be a space outside the engine room. A connecting section of the first pipe section and the second pipe section is positioned inside the first region. In this case, it is possible to prevent freezing of the reducing agent inside the connecting section.

It is preferable for the work vehicle to be further provided with an engine, for the first region to be an engine room in which the engine is arranged, and for the second region to be a space outside the engine room. A connecting section of the first pipe section and the second pipe section is positioned inside the second region. In this case, it is possible to prevent excessive temperature rises in the reducing agent inside the connecting section.

It is preferable for the connecting section of the first pipe section and the second pipe section to be provided in the partition wall. In this case, it is possible to prevent both freezing of and excessive temperature rises in the reducing agent inside the connecting section.

It is preferable for the work vehicle to be further provided with an engine, an exhaust treatment apparatus, a connecting pipe, a reducing agent injection apparatus, and a reducing agent pump. The exhaust treatment apparatus cleans exhaust from the engine using the reducing agent. The connecting pipe is connected with the exhaust treatment apparatus and conducts exhaust from the engine to the exhaust treatment apparatus. The reducing agent injection apparatus injects the reducing agent inside the connecting pipe. The reducing agent pump discharges the reducing agent. The pipe guides the reducing agent from the reducing agent pump to the reducing agent injection apparatus. The engine and the reducing agent injection apparatus are arranged inside the first region. The reducing agent pump is arranged inside the second region.

In this case, since the reducing agent pump is arranged inside the second region which is a lower temperature than the first region, it is possible to prevent excessive temperature rises in the reducing agent in the reducing agent pump. In addition, it is possible to appropriately adjust the temperature of the reducing agent in the first pipe section and the temperature of the reducing agent in the second pipe section between the reducing agent pump and the reducing agent injection apparatus.

It is preferable for the work vehicle to be further provided with an air cleaner which cleans air which is supplied to the engine. The second region is communicated with a space outside the vehicle body. The second region is a space in which the air cleaner is arranged. In this case, it is possible to appropriately adjust the temperature of the reducing agent in the first pipe section and the temperature of the reducing agent in the second pipe section according to each of the temperatures in the engine room which is a high temperature and the space in which the air cleaner is arranged and which is a lower temperature than the engine room.

It is preferable for the work vehicle to be further provided with a radiator for cooling a coolant in the engine. The second region is communicated with a space outside the vehicle body. The second region is a space in which the radiator is arranged. In this case, it is possible to appropriately adjust the temperature of the reducing agent in the first pipe section and the temperature of the reducing agent in the second pipe section according to each of the temperatures in the engine room which is a high temperature and the space in which the radiator is arranged and which is a lower temperature than the engine room.

According to the present invention, it is possible to provide a work vehicle where it is possible to appropriately adjust the temperature of a reducing agent in environments where the temperatures are different.

DETAILED DESCRIPTION OF THE EMBODIMENT(S)

Figure 1:
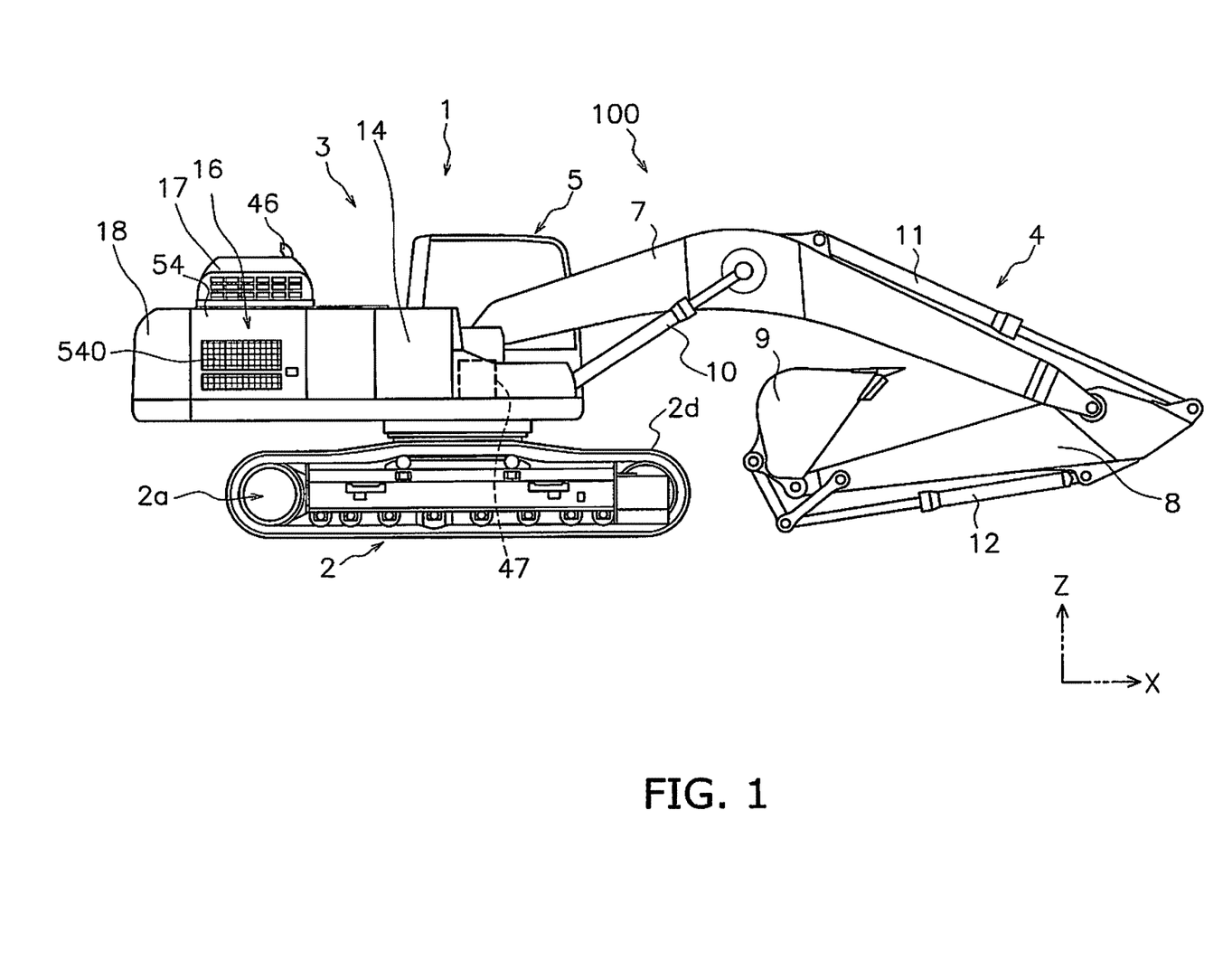
FIG. 1 is a side view of a work vehicle according to an embodiment.
Figure 2:
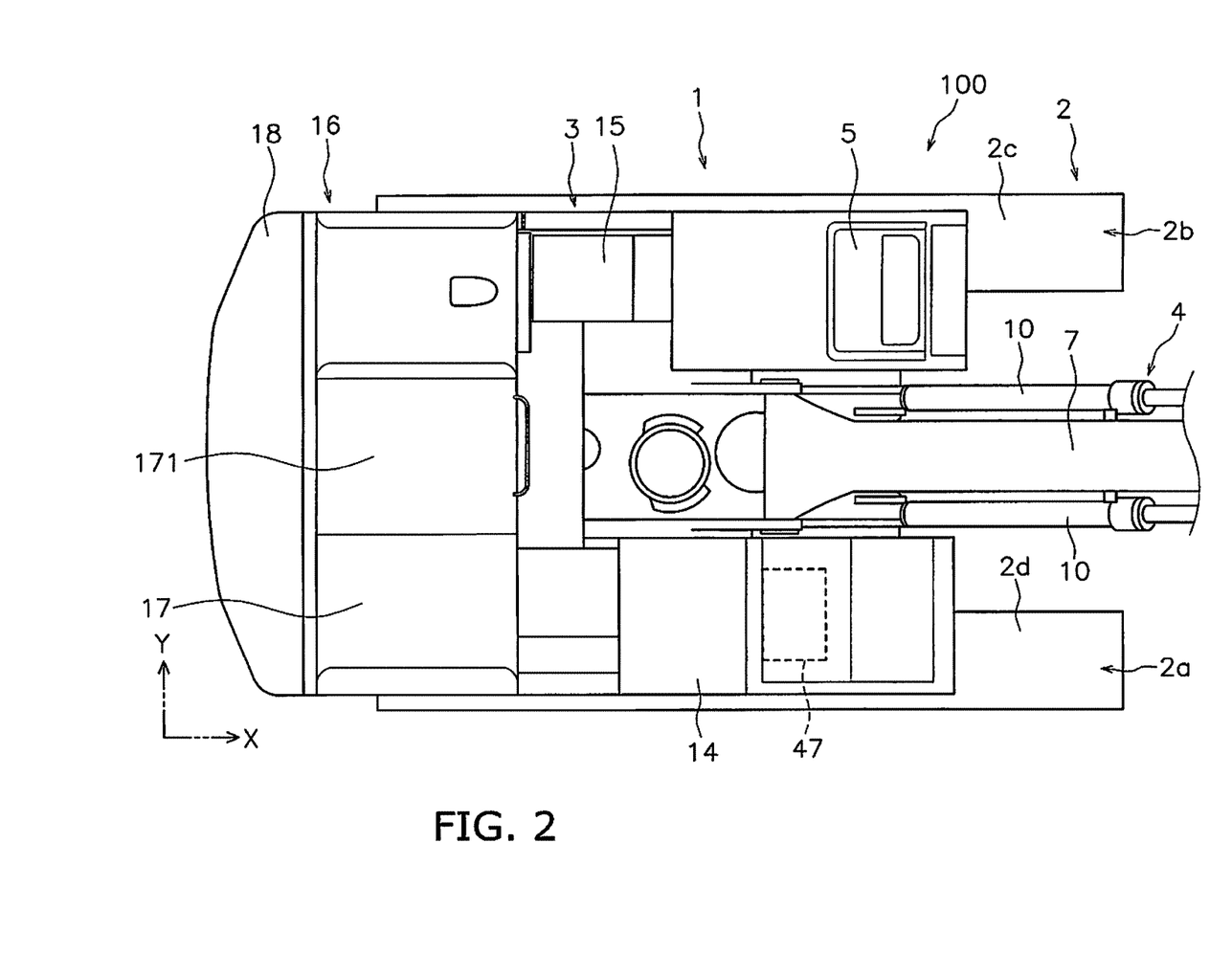
FIG. 2 is a planar view of the work vehicle.

Below, a work vehicle 100 according to an embodiment of the present invention will be described with reference to the diagrams. FIG. 1 is a side view of the work vehicle 100. FIG. 2 is a planar view of the work vehicle 100. The work vehicle 100 according to the present embodiment is a hydraulic excavator. As shown in FIG. 1 and FIG. 2, the work vehicle 100 is provided with a vehicle body 1 and a work implement 4.

The vehicle body 1 has a traveling unit 2 and a revolving unit 3. As shown in FIG. 2, the traveling unit 2 has a pair of traveling apparatuses 2a and 2b. The traveling apparatus 2a has a crawler track 2d. The traveling apparatus 2b has a crawler track 2c. The work vehicle 100 moves due to the traveling apparatuses 2a and 2b driving the crawler tracks 2c and 2d using driving force from an engine 21 (refer to FIG. 3) which will be described later.

Here, in the following description, the front and back direction has the meaning of the front and back direction of the vehicle body 1. In other words, the front and back direction is the direction to the front and back viewed from an operator who is seated in a cab 5. In addition, the left and right direction or the lateral direction has the meaning of the vehicle width direction of the vehicle body 1. In other words, the left and right direction, the vehicle width direction, or the lateral direction is the direction to the left and right viewed from the operator described above. In addition, the front and back direction is shown by the X axis, the left and right direction is shown by the Y axis, and the up and down direction is shown by the Z axis in the diagrams.

The revolving unit 3 is mounted on the traveling unit 2. The revolving unit 3 is configured to revolve with regard to the traveling unit 2. In addition, the cab 5 is provided in the revolving unit 3. The revolving unit 3 has a fuel tank 14, a hydraulic fluid tank 15, an engine room 16, and a counter weight 18. The fuel tank 14 retains fuel for driving the engine 21 which will be described later. The hydraulic fluid tank 15 retains hydraulic fluid which is discharged from a hydraulic pump 23 (refer to FIG. 3) which will be described later. The fuel tank 14 is arranged at one lateral side (the right side in the present embodiment) with regard to the center of the revolving unit 3 in the vehicle width direction and the hydraulic fluid tank 15 is arranged at the other lateral side (the left side in the present embodiment) with regard to the center of the revolving unit 3 in the vehicle width direction. The hydraulic fluid tank 15 is arranged behind the cab 5.

The engine room 16 accommodates equipment such as the engine 21 and the hydraulic pump 23 which will be described later. The engine room 16 is arranged behind the cab 5, the fuel tank 14, and the hydraulic fluid tank 15. An engine hood 17 is arranged above the engine room 16. The counter weight 18 is arranged behind the engine room 16.

The work implement 4 is attached to a front section of the revolving unit 3. The work implement 4 has a boom 7, an arm 8, a bucket 9, a boom cylinder 10, an arm cylinder 11, and a bucket cylinder 12. A base end portion of the boom 7 is rotatably joined to the revolving unit 3. In addition, a base end portion of the arm 8 is rotatably joined to a front end portion of the boom 7. The bucket 9 is rotatably joined to a front end portion of the arm 8. The boom cylinder 10, the arm cylinder 11, and the bucket cylinder 12 are hydraulic cylinders and are driven by hydraulic fluid which is discharged from the hydraulic pump 23 which will be described later. The boom cylinder 10 operates the boom 7. The arm cylinder 11 operates the arm 8. The bucket cylinder 12 operates the bucket 9. The work implement 4 is driven by the cylinders 10, 11, and 12 being driven.

Figure 3:
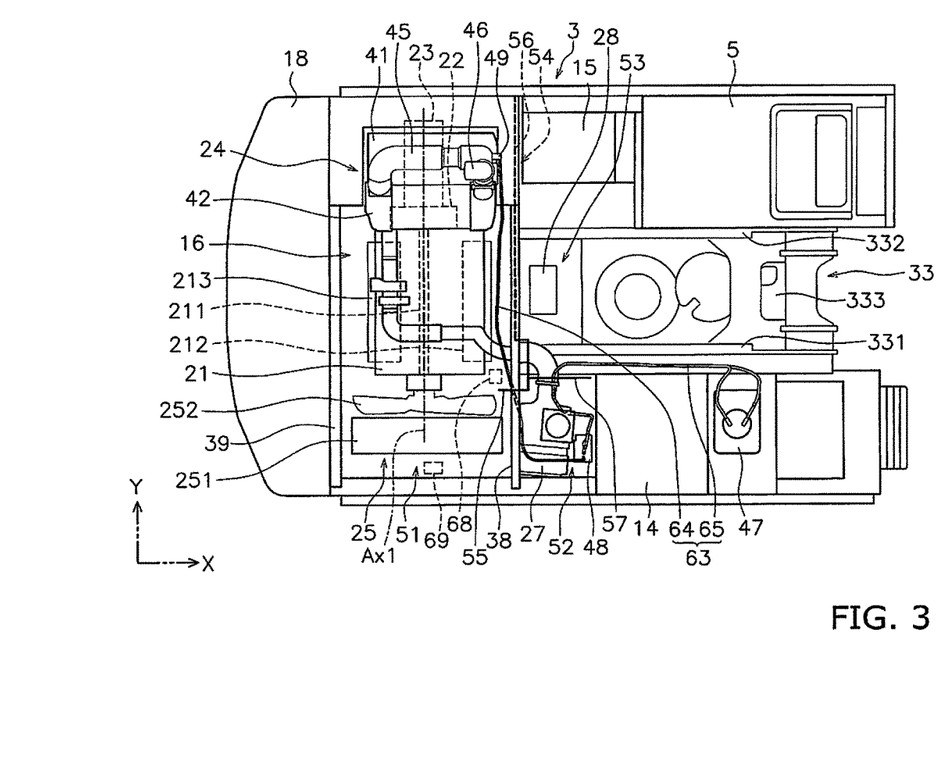
FIG. 3 is a planar view of an inner configuration of the work vehicle.

FIG. 3 is a planar view of the inner configuration of the work vehicle 100. As shown in FIG. 3, the vehicle body 1 includes the engine room 16, a ventilation space 51, a first accommodating space 52, and a second accommodating space 53. The engine 21, a flywheel housing 22, the hydraulic pump 23, and an exhaust treatment apparatus 24 are arranged in the engine room 16. The engine 21 has a crank shaft 211, an intake manifold 212, and an exhaust manifold 213.

The crank shaft 211 is arranged so as to extend in the vehicle width direction. The intake manifold 212 is arranged on the intake side which is one side in a direction which is perpendicular to the longitudinal direction of the crank shaft 211. The longitudinal direction of the crank shaft 211 is a direction along a central axis Ax1 of the crank shaft 211. The exhaust manifold 213 is arranged on the exhaust side which is the other side in a direction which is perpendicular to the longitudinal direction of the crank shaft 211. In the present embodiment, the intake side is the front and the exhaust side is the rear. Accordingly, the intake manifold 212 is arranged forward of the crank shaft 211 in a planar view of the vehicle. The exhaust manifold 213 is arranged rearward of the crank shaft 211 in a planar view of the vehicle.

A cooling apparatus 25 is arranged between the ventilation space 51 and the engine room 16. The cooling apparatus 25 has a radiator 251 and a fan 252. The radiator 251 cools coolant in the engine 21. The fan 252 generates a flow of air inside the engine room 16. The cooling apparatus 25, the engine 21, the flywheel housing 22, and the hydraulic pump 23 are arranged to line up in the vehicle width direction in this order.

As shown in FIG. 1, a ventilation hole 540 is provided in an outer covering 54 of the work vehicle 100 which opposes the ventilation space 51 and air from outside the work vehicle 100 flows from the ventilation hole 540 into the ventilation space 51. The ventilation space 51 is positioned on the upstream side of the cooling apparatus 25 in the flow of air. That is, the ventilation space 51 is a space on the upstream side of the cooling apparatus 25 in the flow of air. The engine room 16 is a space on the downstream side of the cooling apparatus 25 in the flow of air.

Figure 4:
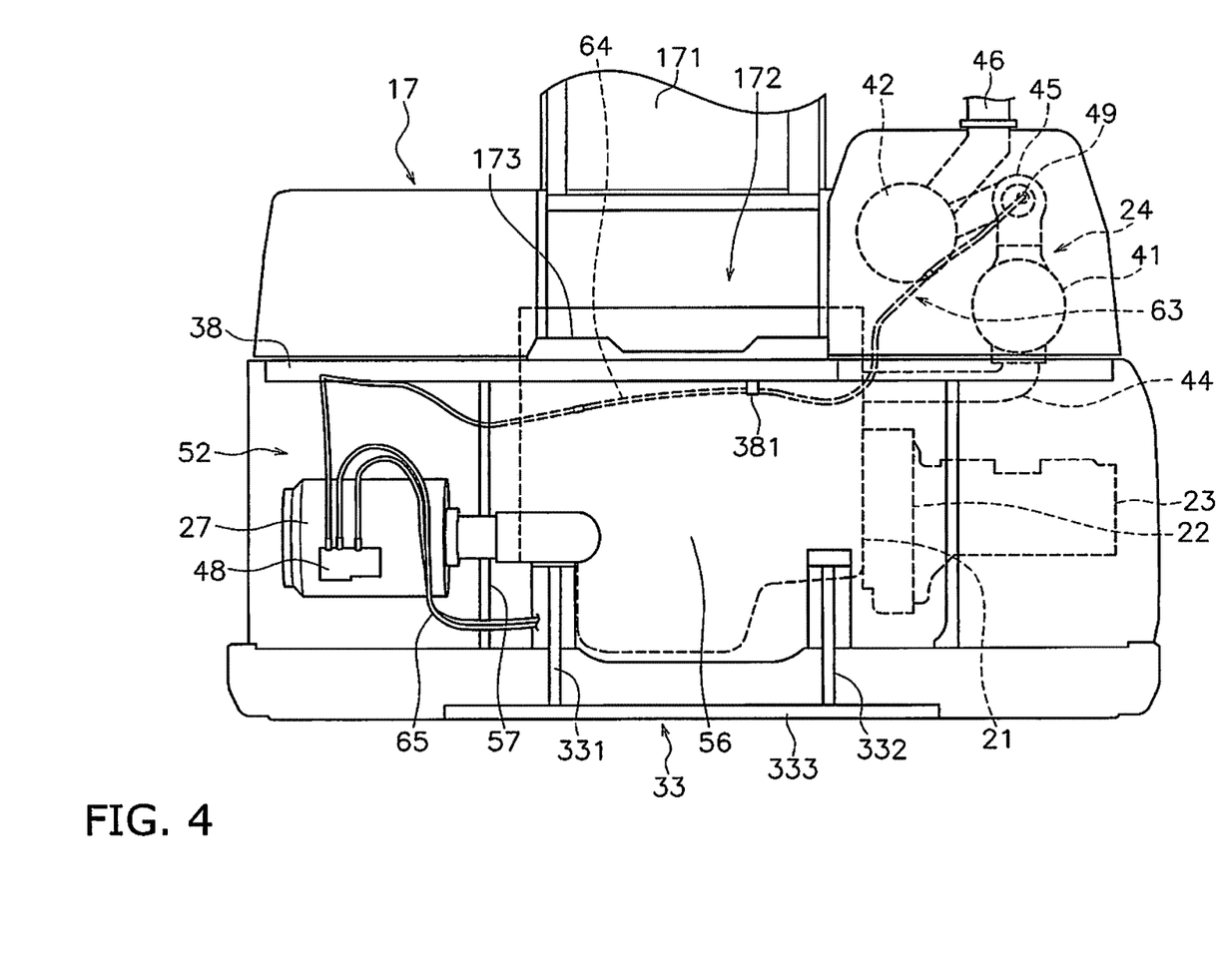
FIG. 4 is a front view of the inner configuration of the work vehicle.

The hydraulic pump 23 is driven by the engine 21. The hydraulic pump 23 is arranged on the side of the engine 21. That is, the hydraulic pump 23 is arranged to line up with the engine 21 in the vehicle width direction. The hydraulic pump 23 is positioned on the opposite side to the engine 21 viewed from the cooling apparatus 25. That is, the engine 21 is positioned between the hydraulic pump 23 and the cooling apparatus 25. FIG. 4 is a front view of the inner configuration of the work vehicle. As shown in FIG. 4, the hydraulic pump 23 is arranged at a position which is lower than the upper surface of the engine 21.

The flywheel housing 22 is arranged between the engine 21 and the hydraulic pump 23. The flywheel housing 22 is attached to the side surface of the engine 21. In addition, the hydraulic pump 23 is attached to the side surface of the flywheel housing 22.

The exhaust treatment apparatus 24 treats exhaust from the engine 21. The exhaust treatment apparatus 24 is arranged above the hydraulic pump 23. At least a portion of the exhaust treatment apparatus 24 is positioned above the engine 21. The exhaust treatment apparatus 24 has a first exhaust treatment apparatus 41 and a second exhaust treatment apparatus 42.

The first exhaust treatment apparatus 41 is an apparatus which treats exhaust from the engine 21. In the present embodiment, the first exhaust treatment apparatus 41 is a diesel particulate filter apparatus which captures particulate matter included in the exhaust using a filter. The first exhaust treatment apparatus 41 burns and incinerates the particulate matter which is captured at an inner section of the first exhaust treatment apparatus 41.

The second exhaust treatment apparatus 42 cleans exhaust from the engine 21 using the reducing agent. In the present embodiment, the second exhaust treatment apparatus 42 is a selective catalytic reduction apparatus which reduces nitrogen oxide NOx using ammonia which is obtained by hydrolysis of a reducing agent such as aqueous urea.

The first exhaust treatment apparatus 41 has an outer shape which is substantially cylindrical. The longitudinal direction of the first exhaust treatment apparatus 41 is arranged along the front and back direction. The second exhaust treatment apparatus 42 has an outer shape which is substantially cylindrical. The longitudinal direction of the second exhaust treatment apparatus 42 is arranged along the front and back direction.

The second exhaust treatment apparatus 42 is arranged between the engine 21 and the first exhaust treatment apparatus 41 in the vehicle width direction. The first exhaust treatment apparatus 41 and the second exhaust treatment apparatus 42 are arranged to be close to each other and are arranged so that the longitudinal directions of the first exhaust treatment apparatus 41 and the second exhaust treatment apparatus 42 are parallel with the front and back direction. The engine 21, the second exhaust treatment apparatus 42, and the first exhaust treatment apparatus 41 are arranged to line up in the vehicle width direction in this order.

As shown in FIG. 4, the engine 21 and the first exhaust treatment apparatus 41 are connected using a first connecting pipe 44. The first connecting pipe 44 extends from the engine 21 in the vehicle width direction. The first exhaust treatment apparatus 41 and the second exhaust treatment apparatus 42 are connected by a second connecting pipe 45. The second connecting pipe 45 is positioned above the first exhaust treatment apparatus 41. The second connecting pipe 45 extends in the front and back direction. A third connecting pipe 46 is connected with the second exhaust treatment apparatus 42. The upper section of the third connecting pipe 46 protrudes upward from the engine hood 17.

A reducing agent injection apparatus 49 is attached to the second connecting pipe 45. The reducing agent injection apparatus 49 injects the reducing agent inside the second connecting pipe 45. The reducing agent which is injected from the reducing agent injection apparatus 49 is mixed with the exhaust inside the second connecting pipe 45 and a gas mixture is supplied to the second exhaust treatment apparatus 42. The reducing agent injection apparatus 49 is arranged on the intake side with regard to the longitudinal direction of the crank shaft 211. That is, the reducing agent injection apparatus 49 is arranged forward with regard to the longitudinal direction of the crank shaft 211. A guiding pipe 63 for supplying the reducing agent to the reducing agent injection apparatus 49 is connected with the reducing agent injection apparatus 49. The guiding pipe 63 will be described in detail later.

The engine 21, the first connecting pipe 44, the first exhaust treatment apparatus 41, the second connecting pipe 45, the second exhaust treatment apparatus 42, and the third connecting pipe 46 are connected in order in series. Accordingly, exhaust from the engine 21 passes through the first connecting pipe 44 and is fed into the first exhaust treatment apparatus 41. The particulate matter is mostly reduced from the exhaust in the first exhaust treatment apparatus 41. Next, the exhaust passes through the second connecting pipe 45 and is fed into the second exhaust treatment apparatus 42. NOx is mostly reduced in the second exhaust treatment apparatus 42. After this, the cleaned exhaust is discharged to the outside by passing through the third connecting pipe 46 as an exhaust pipe.

As shown in FIG. 3, the first accommodating space 52 and the second accommodating space 53 are partitioned from the engine room 16 using the partition wall 54. The partition wall 54 includes a first wall section 55, a second wall section 56, and a third wall section 57. The first wall section 55 partitions the first accommodating space 52 and the engine room 16. The first wall section 55 extends in the front and back direction in a planar diagram of the vehicle. The second wall section 56 partitions the second accommodating space 53 and the engine room 16. The second wall section 56 extends in the vehicle width direction in a planar view of the vehicle. The third wall section 57 partitions the first accommodating space 52 and the second accommodating space 53. The third wall section 57 extends in the front and back direction in a planar view of the vehicle.

The first accommodating space 52 and the second accommodating space 53 are positioned on the intake side with regard to the engine room 16. That is, the first accommodating space 52 and the second accommodating space 53 are positioned forward of the engine room 16. The first accommodating space 52 and the second accommodating space 53 are lined up in the vehicle width direction. In the present embodiment, the first accommodating space 52 is positioned on the right of the second accommodating space 53. The engine room 16 and the second accommodating space 53 are lined up in the front and back direction.

The work vehicle 100 is provided with an air cleaner 27 which cleans air which is supplied to the engine 21. The air cleaner 27 is arranged in the first accommodating space 52. The first accommodating space 52 is positioned behind the fuel tank 14. The first accommodating space 52 is communicated with the ventilation space 51. Accordingly, the first accommodating space 52 is communicated with a space on the outside of the vehicle body 1 via the ventilation space 51. A control valve 28 is arranged in the second accommodating space 53. The control valve 28 controls the flow amount and the flow direction of the hydraulic fluid which is supplied to each of the hydraulic cylinders 10 to 12 in the work implement 4.

The work vehicle 100 has a main frame section 33. The main frame section 33 extends in the front and back direction. The main frame section 33 is arranged below the engine 21 and supports the engine 21. The engine 21 is arranged on the rear section of the main frame section 33. The main frame section 33 has a right main frame 331 and a left main frame 332.

The right main frame 331 and the left main frame 332 are arranged to be spaced from each other in the vehicle width direction. The right main frame 331 and the left main frame 332 are members with plate shapes which extend respectively in the front and back direction and the up and down direction. In addition, the main frame section 33 has a bottom plate 333. The right main frame 331 and the left main frame 332 are joined by the bottom plate 333. The first accommodating space 52 described above is positioned on the right of the right main frame 331. The second accommodating space 53 is positioned between the right main frame 331 and the left main frame 332.

As shown in FIG. 3, the work vehicle 100 has a first frame member 38 and a second frame member 39. The first frame member 38 and the second frame member 39 each extend in the vehicle width direction. The first frame member 38 and the second frame member 39 are arranged to be spaced from each other in the front and back direction. The first frame member 38 is positioned forward of the second frame member 39. The first frame member 38 and the second frame member 39 are positioned above the main frame section 33 and are supported by a plurality of column members (which are not shown in the diagram) which are erected on a revolving frame 31. The exhaust treatment apparatus 24 described above is supported by the first frame member 38 and the second frame member 39. The first frame member 38 is positioned above the second wall section 56 and arranged along the second wall section 56.

As shown in FIG. 4, the engine hood 17 includes a cover section 171. The cover section 171 is configured to open and close an opening 172 which is positioned above the engine room 16. The first frame member 38 is arranged along an edge of the opening 172 in a state where the cover section 171 is opened. The first frame member 38 supports a front edge of the engine hood 17. In addition, the first frame member 38 supports the front edge of the cover section 171. Here, the edge of the opening 172 in the present embodiment is configured by a member 173 which is arranged above the first frame member 38, but the edge of the opening 172 may be configured by the first frame member 38 without the member 173 being provided.

Next, the arrangement of the guiding pipe 63 for supplying the reducing agent to the reducing agent injection apparatus 49 will be described. The guiding pipe 63 has a first guiding pipe 64 and a second guiding pipe 65. The first guiding pipe 64 connects the reducing agent injection apparatus 49 and a reducing agent pump 48. The first guiding pipe 64 guides the reducing agent from the reducing agent pump 48 to the reducing agent injection apparatus 49. The second guiding pipe 65 connects the reducing agent pump 48 and a reducing agent tank 47. The second guiding pipe 65 guides the reducing agent from the reducing agent tank 47 to the reducing agent pump 48.

The reducing agent tank 47 (refer to FIG. 3) retains the reducing agent which is supplied to the second exhaust treatment apparatus 42. The reducing agent pump 48 discharges the reducing agent. The reducing agent pump 48 sucks the reducing agent from the reducing agent tank 47 via the second guiding pipe 65 and supplies the reducing agent to the reducing agent injection apparatus 49 via the first guiding pipe 64.

The reducing agent tank 47 and the reducing agent pump 48 are arranged outside of the engine room 16. The reducing agent tank 47 is arranged in front of the fuel tank 14. The reducing agent pump 48 is arranged behind the fuel tank 14. The reducing agent pump 48 is arranged in the first accommodating space 52. The reducing agent pump 48 is arranged on one lateral side of the main frame section 33 and the reducing agent injection apparatus 49 is arranged on the other lateral side of the main frame section 33. In the present embodiment, the reducing agent pump 48 is arranged on the right of the main frame section 33 and the reducing agent injection apparatus 49 is arranged on the left of the main frame section 33. The control valve 28 described above is arranged between the reducing agent pump 48 and the reducing agent injection apparatus 49 in a direction which is parallel with the longitudinal direction of the crank shaft 211, that is, the vehicle width direction.

The first guiding pipe 64 is arranged so as to pass inside the engine room 16 on the intake side with regard to the longitudinal direction of the crank shaft 211. The first guiding pipe 64 is arranged inside the engine room 16 so as to pass between the partition wall 54 and the engine 21. In detail, the first guiding pipe 64 is arranged so as to pass inside the engine room 16 between the second wall section 56 and the engine 21 and is arranged so as to extend in the vehicle width direction along the second wall section 56.

As shown in FIG. 4, the first guiding pipe 64 is arranged so as to pass above the left main frame 332 and the right main frame 331. In detail, the lowest portion of the first guiding pipe 64 between the left main frame 332 and the right main frame 331 is positioned above the left main frame 332 and the right main frame 331. The first frame member 38 has a bracket 381 which holds the first guiding pipe 64. The first guiding pipe 64 is supported by the first frame member 38 using the bracket 381 and arranged along the first frame member 38. Accordingly, in a state where the cover section 171 of the engine hood 17 is open, the first guiding pipe 64 is arranged along the opening 172 below the opening 172. The first guiding pipe 64 is arranged so as to pass through a through hole which is provided in the first wall section 55 and is arranged to span across the engine room 16 and the first accommodating space 52. The first guiding pipe 64 is connected with the reducing agent pump 48 inside the first accommodating space 52. The first guiding pipe 64 is connected with the reducing agent injection apparatus 49 inside the engine room 16.

The second guiding pipe 65 extends from the reducing agent tank 47 along the main frame section 33 on the outer lateral side of the main frame section 33 and is connected with the reducing agent pump 48 in the first accommodating space 52. The second guiding pipe 65 is arranged so as to pass between the main frame section 33 and the fuel tank 14.

Figure 5:
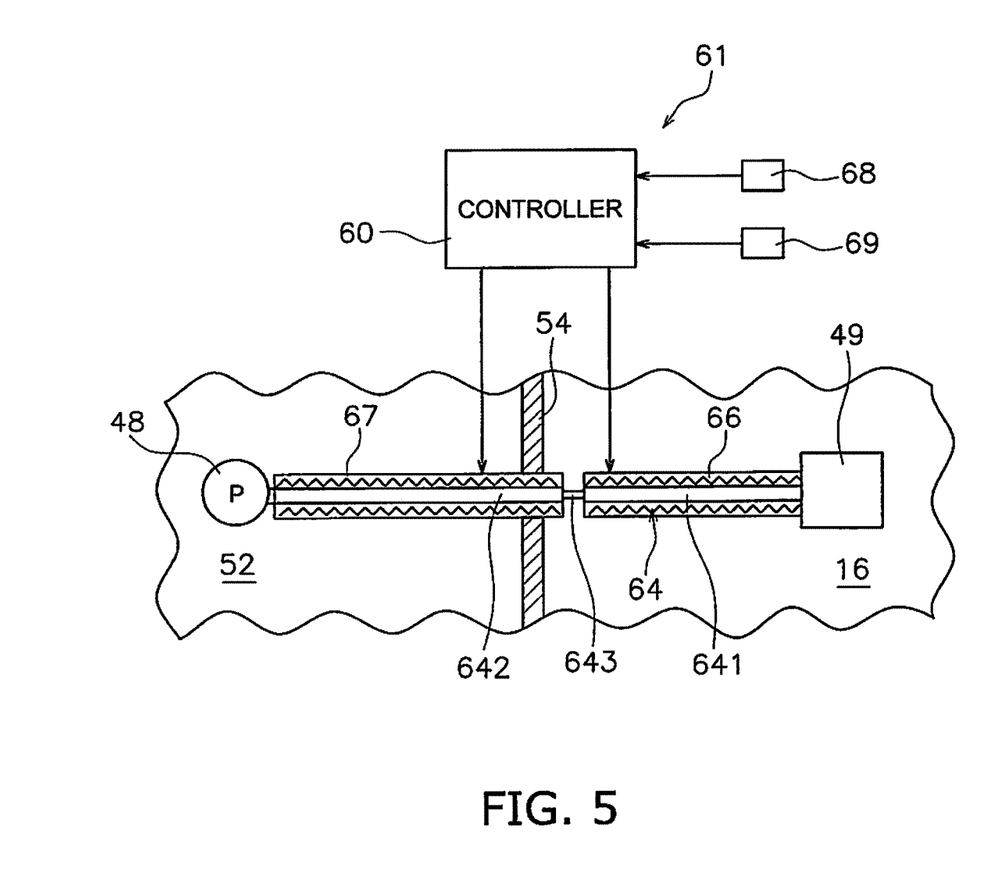
FIG. 5 is a schematic diagram illustrating a configuration of a reducing agent temperature adjusting system for the work vehicle.

The work vehicle 100 is provided with a reducing agent temperature adjusting system 61 for adjusting the temperature of the reducing agent inside the guiding pipe 63. Below, the reducing agent temperature adjusting system 61 will be described. FIG. 5 is a schematic diagram illustrating the configuration of the reducing agent temperature adjusting system 61. The first guiding pipe 64 has a first pipe section 641 and a second pipe section 642. The first pipe section 641 is positioned inside the first region. The second pipe section 642 is positioned inside the second region. In the present embodiment, the first region is the engine room 16. The second region is a space outside the engine room 16. In detail, the second pipe section 642 is arranged in the first accommodating space 52. The first pipe section 641 and the second pipe section 642 are hoses which are made of resin and the reducing agent flows into the inner sections of the first pipe section 641 and the second pipe section 642.

The reducing agent temperature adjusting system 61 has a first heating section 66 and a second heating section 67. The first heating section 66 heats the first pipe section 641. The second heating section 67 heats the second pipe section 642 and is configured to adjust the temperature independently from the first heating section 66. In the present embodiment, the first heating section 66 is a heating wire which is provided along substantially the entire first pipe section 641. For example, the first heating section 66 is wound into the shape of a spiral on the surface of the first pipe section 641. The second heating section 67 is a heating wire which is provided along substantially the entire second pipe section 642. For example, the second heating section 67 is wound into the shape of a spiral on the surface of the second pipe section 642. A connecting section 643 of the first pipe section 641 and the second pipe section 642 is positioned inside the engine room 16.

The reducing agent temperature adjusting system 61 has a first temperature sensor 68, a second temperature sensor 69, and a controller 60. As shown in FIG. 3, the first temperature sensor 68 is arranged inside the engine room 16. In detail, the first temperature sensor 68 is arranged in a space inside the engine room 16 on the intake side. Accordingly, the first temperature sensor 68 detects the temperature of the space on the intake side inside the engine room 16. That is, the first temperature sensor 68 detects the temperature of the space in which the first pipe section 641 is arranged. The second temperature sensor 69 is arranged outside the engine room 16. In detail, the second temperature sensor 69 is arranged in the ventilation space 51. Accordingly, the second temperature sensor 69 detects the temperature in the ventilation space 51. Since air from outside the work vehicle 100 is introduced into the ventilation space 51, the second temperature sensor 69 detects the outside air temperature.

The controller 60 controls the first heating section 66 and the second heating section 67. The controller 60 controls the first heating section 66 based on a detection signal from the first temperature sensor 68 and controls the second heating section 67 based on a detection signal from the second temperature sensor 69.

For example, the controller 60 turns off the power supply to the first heating section 66 when the temperature which is detected by the first temperature sensor 68 is higher than a predetermined temperature. The controller 60 turns on the power supply to the first heating section 66 when the temperature which is detected by the first temperature sensor

68 is the predetermined temperature or less. In addition, the controller 60 turns off the power supply to the second heating section 67 when the temperature which is detected by second temperature sensor 69 is higher than a predetermined temperature. The controller 60 turns on the power supply to the second heating section 67 when the temperature which is detected by the second temperature sensor 69 is the predetermined temperature or less.

The work vehicle 100 according to the present embodiment has the following characteristics.

Since it is possible to adjust the temperatures of each of the first heating section 66 and the second heating section 67 independently from each other, it is possible for the controller 60 to independently adjust each of the temperature of the reducing agent inside the first pipe section 641 and the temperature of the reducing agent inside the second pipe section 642. Due to this, it is possible to appropriately adjust each of the temperature of the reducing agent inside the first pipe section 641 and the temperature of the reducing agent inside the second pipe section 642.

The controller 60 controls the first heating section 66 based on a detection signal from the first temperature sensor 68 and controls the second heating section 67 based on a detection signal from the second temperature sensor 69. As a result, it is possible to adjust the temperature of the reducing agent in the first pipe section 641 based on the temperature inside the engine room 16 which is detected by the first temperature sensor 68. In addition, it is possible to adjust the temperature of the reducing agent in the second pipe section 642 based on the outside temperature which is detected by the second temperature sensor 69. Due to this, it is possible to appropriately adjust each of the temperature of the reducing agent in the first pipe section 641 and the temperature of the reducing agent in the second pipe section 642.

The connecting section 643 of the first pipe section 641 and the second pipe section 642 is positioned inside the engine room 16. Since the temperature inside the engine room 16 is higher than the temperature outside the engine room 16, it is possible to prevent freezing of the reducing agent inside the connecting section.

An embodiment of the present invention is described above, but the present invention is not limited to the embodiment described above and various types of modifications are possible in a scope which does not depart from the gist of the invention.

The work vehicle is not limited to a hydraulic excavator and may be another vehicle such as a wheel loader, a motor grader, or a bulldozer.

The configuration of the exhaust treatment unit is not limited to the configuration described above. For example, the second exhaust treatment apparatus 42 may be an apparatus which uses a reducing agent which is different from aqueous urea. The first exhaust treatment apparatus 41 may be a treatment apparatus which is different from a diesel particulate filter apparatus. The first exhaust treatment apparatus 41 and the second exhaust treatment apparatus 42 may be arranged at positions which are different from the positions described above. The first exhaust treatment apparatus 41 is not limited to being a cylindrical shape or the like and may be another shape such as an elliptical shape or a rectangular shape. The second exhaust treatment apparatus 42 is not limited to being a cylindrical shape or the like and may be another shape such as an elliptical shape or a rectangular shape. The connecting pipes 44, 45, and 46 may be arranged at positions which are different from the positions described above. For example, the second connecting pipe 45 may be arranged below the first exhaust treatment apparatus 41.

The configuration inside the vehicle body of the work vehicle is not limited to the embodiment described above. For example, in the embodiment described above, the crank shaft 211 extends in the vehicle width direction, but the crank shaft 211 may extend in the front and back direction. Alternatively, in contrast to the embodiment described above, the intake side may be the rear side with regard to the longitudinal direction of the crank shaft 211 and the exhaust side may be the front side with regard to the longitudinal direction of the crank shaft 211.

The arrangement of the guiding pipe 63 is not limited to the arrangement in the embodiment described above. For example, the first guiding pipe 64 may be arranged on the exhaust side with regard to the longitudinal direction of the crank shaft 211. The first guiding pipe 64 may be arranged so as to pass through the second accommodating space 53.

The second temperature sensor 69 may be omitted. In this case, the controller 60 controls the first heating section 66 based on a detection signal from the first temperature sensor 68 and controls the second heating section 67 based on a temperature which is calculated based on the detection signal from the first temperature sensor 68. For example, the controller 60 may estimate the outside temperature from the temperature which is detected by the first temperature sensor 68 and may control the second heating section 67 based on the outside temperature which is estimated.

The first temperature sensor 68 may be omitted. In this case, the controller 60 controls the second heating section 67 based on a detection signal from the second temperature sensor 69 and controls the first heating section 66 based on a temperature which is calculated based on the detection signal from the second temperature sensor 69. For example, the controller 60 may estimate the temperature inside the engine room 16 from the temperature which is detected by the second temperature sensor 69 and may control the first heating section 66 based on the temperature inside the engine room 16 which is estimated.

The first temperature sensor 68 is not limited to being arranged in the space inside the engine room 16 on the intake side and may be arranged in another location. However, it is preferable for the first temperature sensor 68 to be arranged inside the engine room 16. The second temperature sensor 69 is not limited to being arranged in the ventilation space 51 and may be arranged in another location which is outside the engine room such as the first accommodating space 52.

Figure 6:
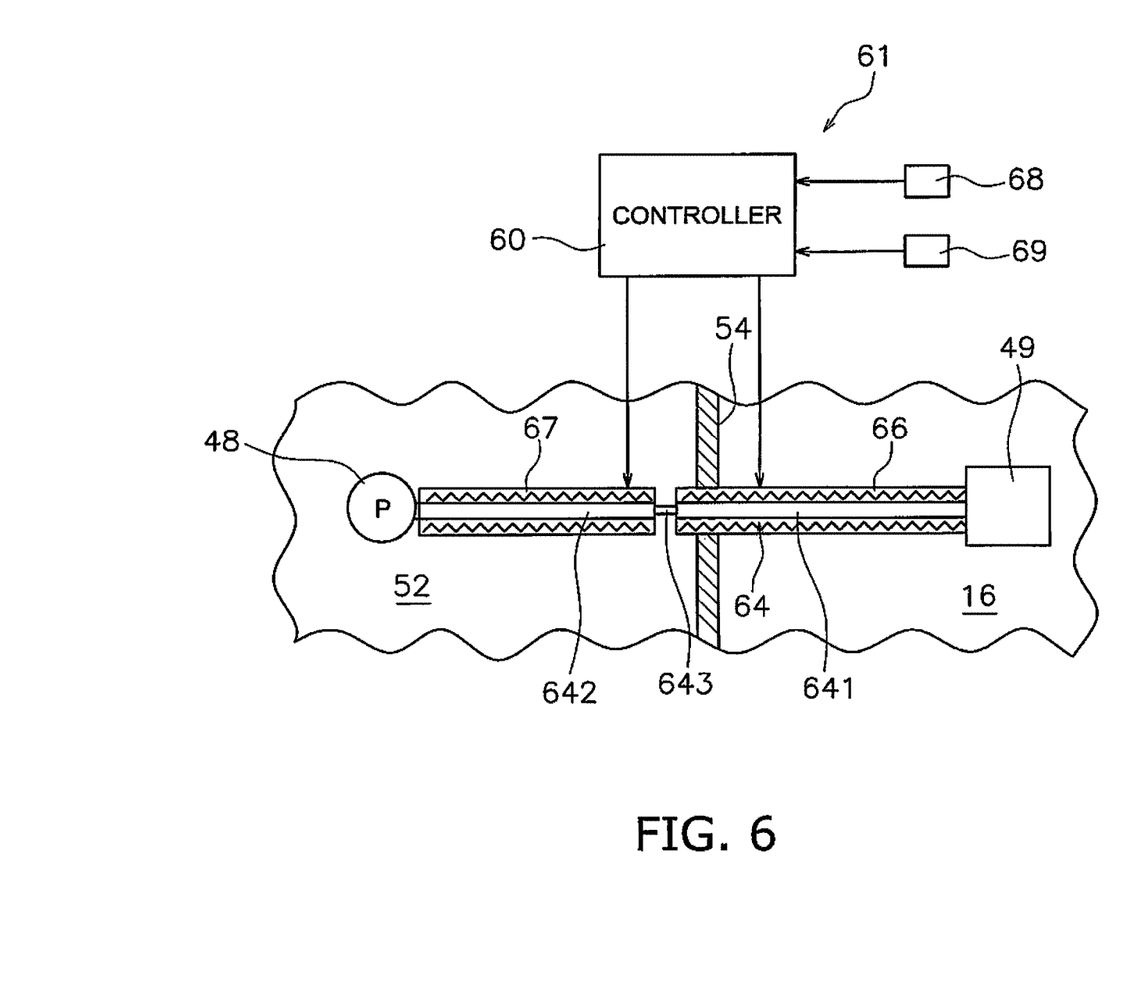
FIG. 6 is a schematic diagram illustrating a first modified example of the reducing agent temperature adjusting system.

The connecting section 643 of the first pipe section 641 and the second pipe section 642 may be positioned outside the engine room 16. For example, the connecting section 643 of the first pipe section 641 and the second pipe section 642 may be positioned inside the first accommodating space 52 as shown in FIG. 6. In this case, it is possible to prevent excessive temperature rises in the reducing agent inside the connecting section 643.

Figure 7:
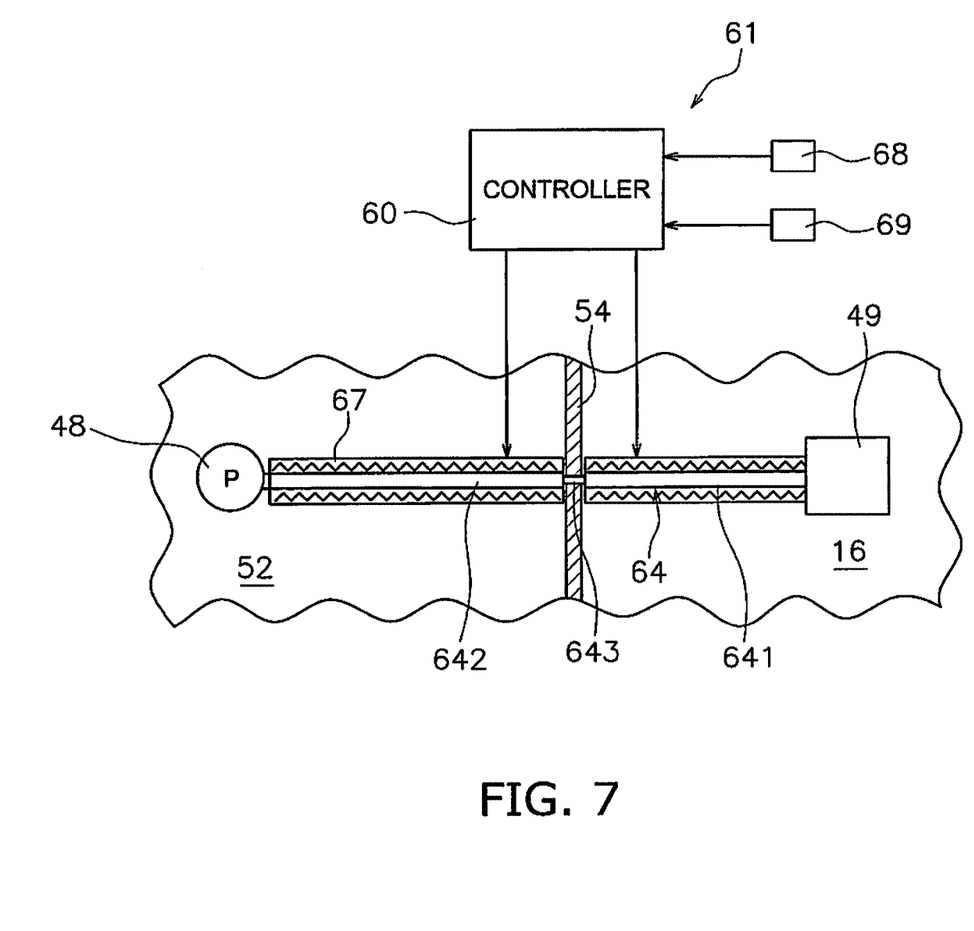
FIG. 7 is a schematic diagram illustrating a second modified example of the reducing agent temperature adjusting system.

Alternatively, the connecting section 643 of the first pipe section 641 and the second pipe section 642 may be provided in the partition wall 54 as shown in FIG. 7. In this case, it is possible to prevent both freezing of and excessive temperature rises in the reducing agent inside the connecting section 643.

The first heating section 66 is not limited to being provided over the entirety of the first guiding pipe 641 and may be provided in only a portion of the first guiding pipe 641. The second heating section 67 is not limited to being provided over the entirety of the second pipe section 642 and may be provided in only a portion of the second pipe section 642. As long as the first heating section 66 and the second heating section 67 are means which is configured to adjust the temperature of the reducing agent inside the guiding pipe 63, the first heating section 66 and the second heating section 67 are not limited to being a heating wire and may be another means. The second heating section 67 may be provided in the second guiding pipe 65 in addition to the first guiding pipe 64.

In the embodiment described above, the first region is inside the engine room 16 and the second region is outside the engine room 16, but the first region and the second region are not limited to these regions. For example, the first region may be the second accommodating space 53 and the second region may be the first accommodating space 52.

According to the present invention, it is possible to provide a work vehicle where it is possible to appropriately adjust the temperature of a reducing agent in environments where the temperatures are different.

The invention claimed is:

1. A work vehicle comprising:
    an engine;
    a vehicle body having a partition wall configured to partition a space in an inner section into a first region and a second region having different temperature environments from each other, the first region being an engine room in which the engine is arranged, the second region being a space outside the engine room;
    a reducing agent injection apparatus arranged in the first region and configured to inject a reducing agent into an exhaust treatment apparatus;
    a reducing agent pump arranged in the second region and configured to pump the reducing agent to the reducing agent injection apparatus;
    a guiding pipe configured to guide the reducing agent from the reducing agent pump to the reducing agent injection apparatus, the guiding pipe having a first pipe section positioned inside the first region and a second pipe section positioned inside the second region, the first pipe section extending from the reducing agent injection apparatus toward the partition wall and the second pipe section extending from the reducing agent pump toward the partition wall;
    a first heating section provided on the first pipe section and configured to heat the first pipe section;
    a second heating section provided on the second pipe section and configured to heat the second pipe section; and
    a controller that controls the first heating section and the second heating section such that a temperature of the first heating section and a temperature of the second heating section are adjusted independently from each other.

2. The work vehicle according to claim 1, further comprising:
    a first temperature sensor arranged inside the first region; and
    a second temperature sensor arranged inside the second region,
    the controller being configured to control the first heating section based on a detection signal from the first temperature sensor and to control the second heating section based on a detection signal from the second temperature sensor.

3. The work vehicle according to claim 2, wherein
    a connecting section of the first pipe section and the second pipe section is positioned inside the first region.

4. The work vehicle according to claim 2, wherein
    a connecting section of the first pipe section and the second pipe section is positioned inside the second region.

5. The work vehicle according to claim 2, wherein
    a connecting section of the first pipe section and the second pipe section being provided in the partition wall.

6. The work vehicle according to claim 1, further comprising:
    a first temperature sensor arranged inside the first region,
    the controller being configured to control the first heating section based on a detection signal from the first temperature sensor and to control the second heating section based on a temperature calculated based on the detection signal from the first temperature sensor.

7. The work vehicle according to claim 6, wherein
    a connecting section of the first pipe section and the second pipe section is positioned inside the first region.

8. The work vehicle according to claim 6, wherein
    a connecting section of the first pipe section and the second pipe section is positioned inside the second region.

9. The work vehicle according to claim 3, wherein
    a connecting section of the first pipe section and the second pipe section being provided in the partition wall.

10. The work vehicle according to claim 1, further comprising:
    a second temperature sensor arranged inside the second region,
    the controller being configured to control the second heating section based on a detection signal from the second temperature sensor and to control the first heating section based on a temperature calculated based on the detection signal from the second temperature sensor.

11. The work vehicle according to claim 10, further wherein
    a connecting section of the first pipe section and the second pipe section being positioned inside the first region.

12. The work vehicle according to claim 10, wherein
    a connecting section of the first pipe section and the second pipe section is positioned inside the second region.

13. The work vehicle according to claim 10, wherein
    a connecting section of the first pipe section and the second pipe section being provided in the partition wall.

14. The work vehicle according to claim 1, wherein
    a connecting section of the first pipe section and the second pipe section is positioned inside the first region.

15. The work vehicle according to claim 1, wherein
    a connecting section of the first pipe section and the second pipe section is positioned inside the second region.

16. The work vehicle according to claim 1, wherein
    a connecting section of the first pipe section and the second pipe section being provided in the partition wall.

17. The work vehicle according to claim 1, wherein
    the first heating section includes a first heating wire wound onto the first pipe section, and
    the second heating section includes a second heating wire wound onto the second pipe section.

18. A work vehicle comprising:
a vehicle body having a partition wall configured to partition a space in an inner section into a first region and a second region having different temperature environments from each other, the first region being an engine room, the second region being a space outside the engine room;
a guiding pipe configured to guide a reducing agent, the guiding pipe having a first pipe section positioned inside the first region and a second pipe section positioned inside the second region;
a first heating section provided on the first pipe section and configured to heat the first pipe section;
a second heating section provided on the second pipe section and configured to heat the second pipe section;
a connecting section connected between the first pipe section and the second pipe section, the first and second heating sections being separated from each other with the connecting section in-between;
an engine arranged in the first region;
an exhaust treatment apparatus arranged in the first region and configured to clean exhaust from the engine using a reducing agent;
a connecting pipe connected to the exhaust treatment apparatus, the connecting pipe being configured to conduct exhaust from the engine to the exhaust treatment apparatus;
a reducing agent injection apparatus arranged in the first region and configured to inject the reducing agent inside the connecting pipe; and
a reducing agent pump arranged in the second region and configured to discharge the reducing agent,
the guiding pipe being configured to guide the reducing agent from the reducing agent pump to the reducing agent injection apparatus,
the first pipe section of the guiding pipe extending from the reducing agent injection apparatus toward the partition wall and the second pipe section of the guiding pipe extending from the reducing agent pump toward the partition wall.

19. The work vehicle according to claim 18, further comprising:
an air cleaner configured to clean air supplied to the engine,
the second region being a space with the air cleaner arranged therein, and the second region being linked with a space outside the vehicle body.

20. The work vehicle according to claim 18, further comprising:
a radiator configured to cool a coolant in the engine,
the second region being a space with the radiator arranged therein, and the second region being linked with a space outside the vehicle body.

21. The work vehicle according to claim 18, wherein the connecting section is disposed inside the first region.

22. The work vehicle according to claim 18, wherein the connecting section is disposed inside the second region.

23. The work vehicle according to claim 18, wherein the connecting section is disposed within the partition wall.

24. The work vehicle according to claim 18, wherein the first heating section includes a first heating wire wound onto the first pipe section, and
the second heating section includes a second heating wire wound onto the second pipe section.

\* \* \* \* \*